United States Patent [19]

Hanlet et al.

[11] Patent Number: 4,554,908
[45] Date of Patent: Nov. 26, 1985

[54] ELECTROMAGNETIC ENERGY ABSORBER

[75] Inventors: Jacques M. Hanlet, Lake Worth; Elia R. J. Tarantino, Palm Beach, both of Fla.

[73] Assignee: Alpha-Omega Development Inc., Loxahatchee, Fla.

[21] Appl. No.: 634,827

[22] Filed: Jul. 26, 1984

Related U.S. Application Data

[63] Continuation of Ser. No. 70,606, Aug. 29, 1979, abandoned.

[51] Int. Cl.⁴ ............................................... F23J 3/02
[52] U.S. Cl. ..................................... 126/443; 126/442; 126/901; 165/179
[58] Field of Search ............... 126/442, 446, 449, 443, 126/439, 901; 165/179, 181, 182, 184

[56] References Cited

U.S. PATENT DOCUMENTS

| 980,505 | 1/1911 | Emmett | 126/439 |
|---|---|---|---|
| 2,872,915 | 2/1959 | Bowen | 126/439 |
| 3,954,097 | 5/1976 | Wilson, Jr. | 126/438 |
| 3,957,030 | 5/1976 | Davis | 126/439 |
| 4,003,364 | 1/1977 | Balkus, Jr. | 126/438 |
| 4,134,391 | 1/1979 | Mahdjuri et al. | 126/438 |
| 4,154,220 | 3/1979 | Loth | 126/439 |
| 4,180,055 | 12/1979 | Hodrall | 126/443 |
| 4,452,233 | 6/1984 | Goodman, Jr. et al. | 126/443 |

Primary Examiner—James C. Yeung
Assistant Examiner—Helen Ann Odar
Attorney, Agent, or Firm—Morton J. Rosenberg

[57] ABSTRACT

There is disclosed an electromagnetic energy collector assembly in which a transparent cylindrical glass tube made from common glass tubing lengths is sealed under vacuum at one end to an inner cylindrical energy absorber having a plurality of grooves on the exterior surface. The inner absorber may be constructed of glass, metal, or other material and the energy absorbing surfaces have grooves which may be helical, or parallel or longitudinal to the normal axis of the absorber. One or more of energy collectors are connected into a manifold for circulation of a fluid working media, e.g., gas or water, which is eventually utilized in any application of thermal energy, e.g., heating, cooling or driving a turbine. The collector assembly is particularly useful in the collection of solar energy.

6 Claims, 25 Drawing Figures

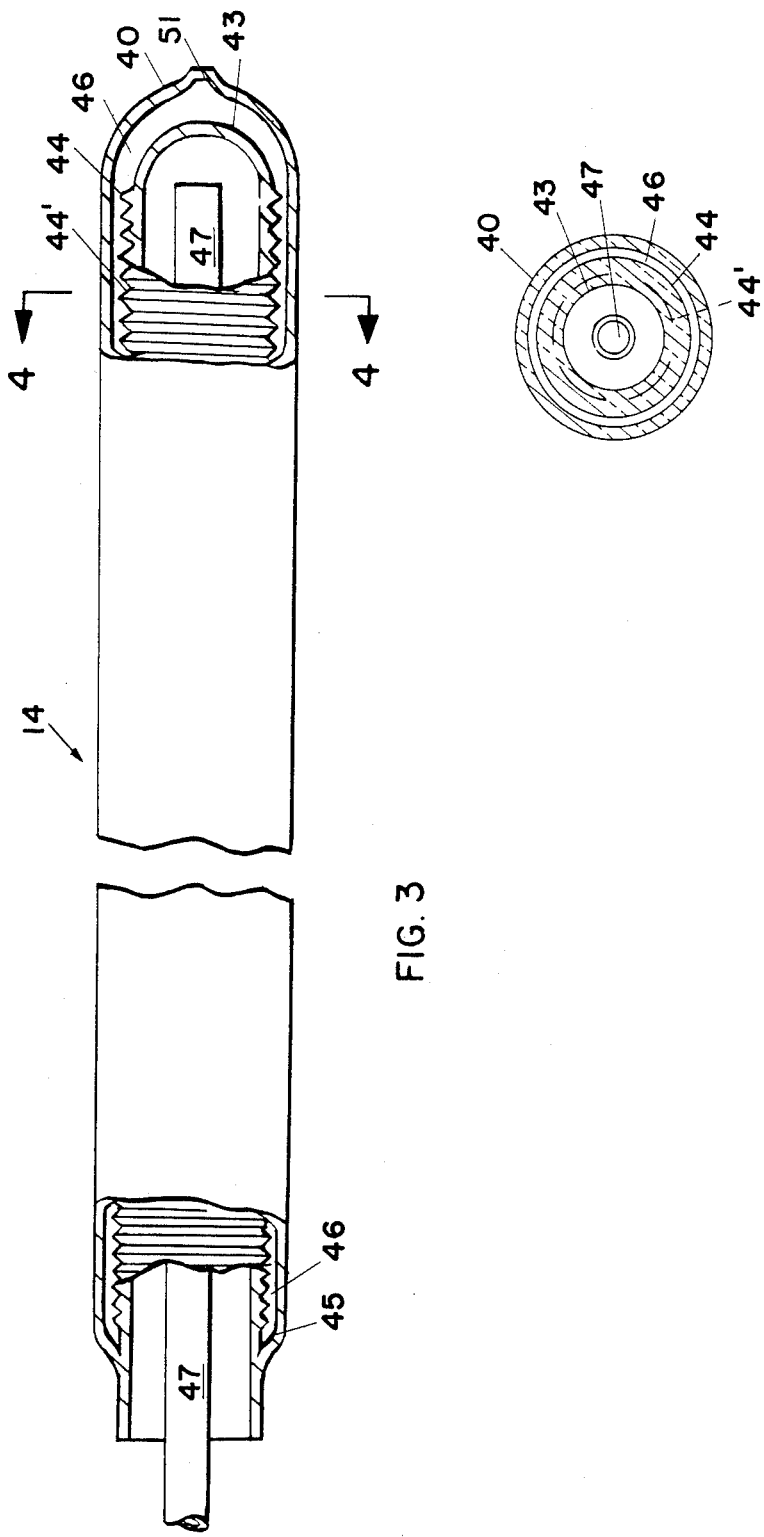

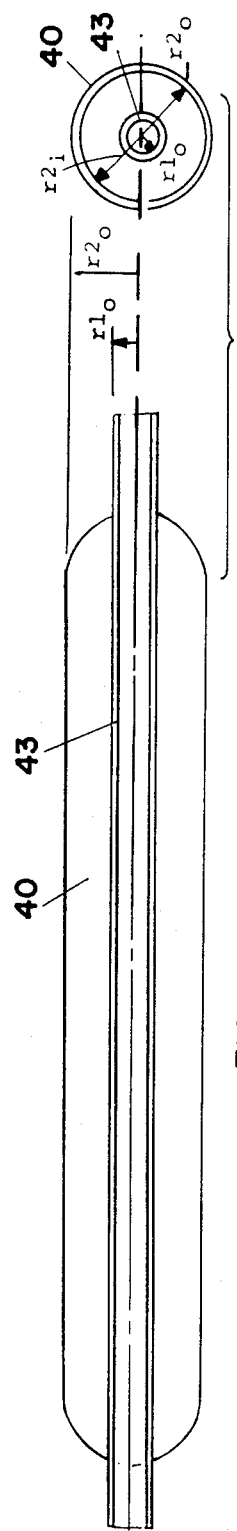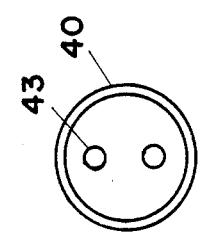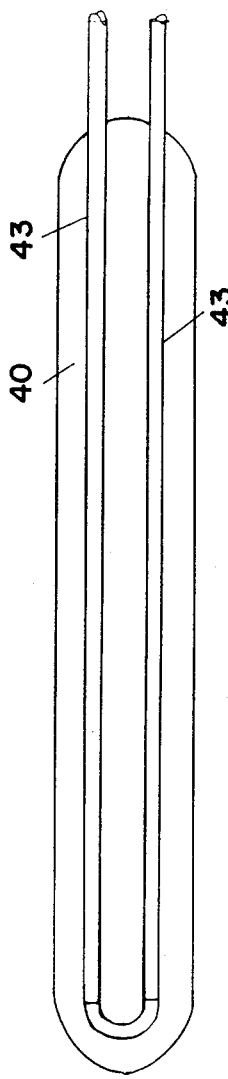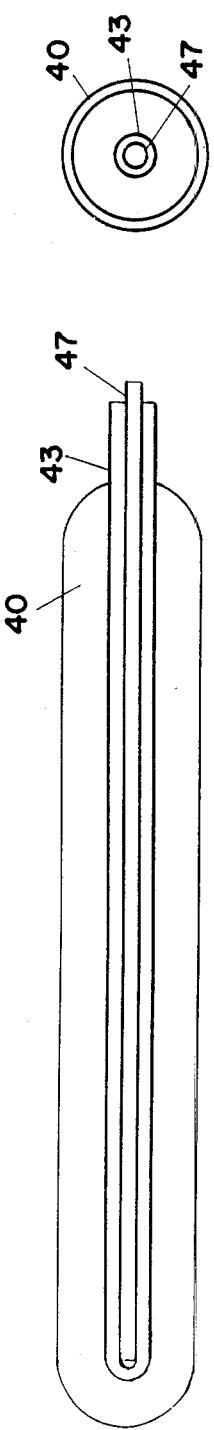

ELECTROMAGNETIC ENERGY ABSORBER

This is a continuation of Ser. No. 070,606 filed on Aug. 29, 1979, now abandoned.

The invention relates to the collection and conversion of electromagnetic radiation, such as the sun's energy, by absorption in the form of heat exchange through a relatively inexpensive, simple and efficient absorber element. More particularly, the invention relates to tubular type solar energy collectors which operate in an array of tube collectors connected into a manifold for transferring and circulating a fluid working media for heat or energy exchange, by absorption, with a novel absorber element.

BACKGROUND OF THE INVENTION

Solar radiation is made up of two primary components, one of which is a collimated beam of light which is incident upon the surface of the earth from the position of the sun at any given time period. A second component of solar energy is diffuse radiation. This component is available at a surface from various directions and is not collimated. In collecting solar energy, one basic system is the so-called flat plate collector array. In its simplest form, a flat plate collector comprises a sheet of glass or transparent material disposed above an energy absorbing flat plate so constructed that it acts as a black body to absorb heat. At the back of the absorbing surface, a heat exchange fluid, in either gas or liquid form, is circulated to exchange the heat of the sun to the heat exchange fluid, the heated fluid subsequently being used to heat a home, water supply or swimming pool. In a flat plate collector, major energy absorption occurs at the time when the collimated beam of light is overhead or at solar noon. At this time, the maximum energy is incident on the flat plate surface. However, as the collimated beam moves in response to the motion of the sun, particularly during winter in areas away from the equator, the angle at which the collimated beam strikes a horizontal flat surface becomes lower and thereby causes a loss of available energy due to the angle of incidence of the collimated beam. To some extent, this problem is solved by inclining the flat plate collector to compensate for the sun's position.

Another basic solar energy collecting system currently in use is the double-walled tubular glass collector. These collectors are made of glass concentric tubes, one within the other, and sealed together to provide an annular space between them that is evacuated to a hard vacuum, i.e. $10^{-4}$ torr. The outer "cover tube" is transparent and the inner "absorber tube" is selectively coated over the surface that is in the vacuum space. The selective coating is made by vacuum deposition of a thin layer (1000 Å) of aluminum on the inner glass absorber tube's outer surface. Chromium is then electrically vaporized over the aluminum substrate as black chrome to a thickness of about 1500 Å. The selective coating provides an absorbing surface having 0.8 or greater absorptance and 0.1 or lower infrared emittance. The glass concentric tubes are inserted in liquid tight connections in a manifold and placed along opposite sides of the manifold which cross-connects the tubes to each other and serially connects the tubes along the manifold such that a heat exchange fluid is pumped into each of the absorber tubes to fill them and pumped through the tubes in series to extract and collect the heat of the solar radiation absorbed by the absorber tubes. Solar collectors of this type are disclosed in U.S. Pat. Nos. 3,952,724; 4,043,318; 4,018,215; 4,033,327 and the disclosures thereof are hereby incorporated by reference.

The double-walled glass collectors have also been equipped with various reflectors so that diffuse and direct sunlight reach the absorber tubes. See, for example, U.S. Pat. No. 4,002,160. Arrays of tubular glass collectors offer the advantages of operating at a higher output temperature than the flat plate type collector. Additionally, the tubular collectors weigh and cost less than flat plate collectors.

In the past, one measure of the performance of a solar collector has been the ratio of the shortwave solar absorptance $(\alpha)$ to the longwave thermal emittance $(\epsilon)$. This ratio, however, does not always adequately define the best performance for a practical solar collector since the ratio of the collecting and emitting surfaces also influence the over-all performance. The performance of a collector further depends on its orientation with respect to the sun. A maximum performance can only be achieved by any solar collector when its surface is orientated perpendicularly to the direct rays of the sun. Thus for solar collectors having a fixed orientation with respect to the sun, maximum performance can only be achieved only when the sun is normal to the plane of the collector surface. This only occurs for a short period of time during the solar year and the $\alpha/\epsilon$ ratio never reaches a very high value ($\alpha/\epsilon=10$) and known collectors based on such principles have never been able to operate Carnot engines with an acceptable efficiency of more than 50%. Since more than 25% of the total energy consumed in this country is used for the heating and cooling of buildings and the provision of hot water, the diversion of this energy demand from fossil fuels to solar energy would result in a substantial reduction in this nation's dependence on foreign energy supplies. Solar energy is a vast and relatively untapped energy source and the need remains for solar collectors of high efficiency and simplicity of structure.

SUMMARY OF INVENTION

The present invention provides an absorber element for tubular collectors for operation with a fluid heat exchange media, such as gas or water, which is designed for high performance due to its symmetry of revolution and the grooved structure of its surface. The symmetry of revolution permits the capture of solar energy over an angle of 360° with equal efficiency whereas the grooved structure of the absorber element renders the use of a solar collector embodying the absorber element independent of the orientation of the sun. Due to these properties, the solar collector of the invention can absorb direct radiation from the sun and capture the large amount of diffuse energy contained in the totality of the celestial dome which is directly or indirectly reflected by any surface.

Other advantages include the reduction in emitted energy by the reduction in size of the surface of the absorber element. It will be apparent that further advantages and features will be understood by those skilled in the art after reading the detailed description and accompanying drawings.

BRIEF DESCRIPTION OF THE DRAWINGS

FIG. 3 is another embodiment of a tubular collector incorporating the invention, partly broken away and in section.

FIG. 4 is a sectional view taken along line 4—4 on FIG. 3.

FIGS. 10, 10A and 10B are longitudinal sections through both the outer cylindrical glass tube and the inner absorber tube of three collector assemblies, FIGS. 11, 11A and 11B are cross-sections of the collector assemblies shown in FIGS. 10, 10A and 10B. In FIGS. 1–13 similar and like parts have been given like numbers.

FIGS. 12, 12A, 12B, 12C and 12D are sectional side views of grooves having different configurations.

FIG. 12 shows a triangular groove.

FIG. 12A shows a U-shaped section with non-parallel sidewalls.

FIG. 12B shows a rectangular groove with apical crests separating the groove.

FIG. 12C shows a rectangular groove with thin separating partitions between grooves.

FIG. 12D shows a U-shaped section with parallel sidewalls.

FIGS. 13, 13A and 13B show the relationship between the angle of orientation of the collimated radiation from the sun and geometry of the absorber.

DETAILED DESCRIPTION

Figure 1:
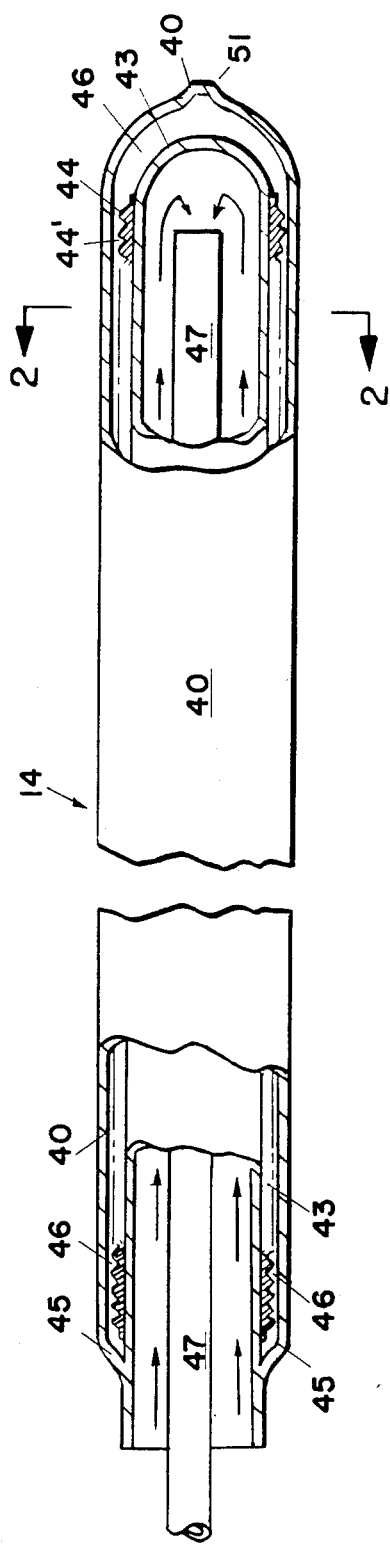
FIG. 1 is a side view, partly broken away and in section, showing a tubular solar energy collector incorporating the invention.
Figure 2:
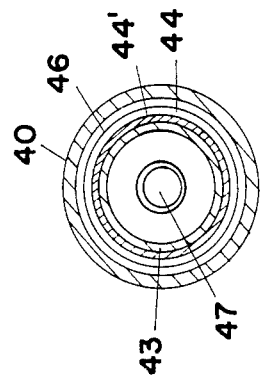
FIG. 2 is a sectional view taken along line 2—2 on FIG. 1.

With reference to the accompanying drawing, FIGS. 1 and 2 illustrate one embodiment of the invention and the construction of a tubular solar collector in accordance therewith. Collector 14 is constructed of transparent outer glass tube 40 that is of convenient length, e.g., 4 to 7 feet and of standard diameter similar to a fluorescent light tube, e.g., 2 inches O.D. An absorber tube 43 is disposed within outer tube 40 and is sealed at 45 to the outer tube. In the embodiment shown the inner tube 43 is made of glass, but could be metal or plastic, and is sealed along the wall to the outer tube 40 by a glass-to-glass or glass-to-metal seal. The glass tubes of the collector assembly are fabricated from known and standard glass shapes of either a soda-lime glass composition or a borosilicate glass composition. Both glasses are relatively inexpensive. The balance of the parts of collector 14 may be readily made from plastics or metal by known techniques and at a relatively low cost. Absorber tube 43 may be coated with a selectively absorbing material such as described for the Al-CrO$_x$ combination, or a suitable alloy, or a metal having the desired emissivity and absorptivity.

The tubes 40 and 43 are of differing sizes (diameter) such that a space 46 is provided therebetween. The space 46, after the end wall sealing at 45, is evacuated to a hard vacuum on the order of $10^{-4}$ torr. Lower vacuum can be used through use of getters. The vacuum is pumped off at the tip 51 of outer tube 40 and a tubulation thereat sealed off, a known expedient for evacuation of space. The vacuum in space 46 will reduce and substantially eliminate conduction and convection losses from the collector. An annular cross-connecting tube 47 extends through a position adjacent the closed end of tube 43 of collector 14. The collector is in communication with several of the tubular collectors 14 detachably connected to a manifold system only through the cross-connecting tube 47. The solar energy that is incident upon the inner tube 43 will result in a temperature increase of the tube 43. The working fluid, e.g., water, to be heated by solar energy is pumped from a source in the system and enters a manifold through a suitable inlet line. Since the invention described herein does not pertain to a manifold system which furnishes the fluid media to the tubes and transfers the heated fluid for storage or use, the drawings do not include a manifold module for ease of illustration; however, to those skilled in the art, the construction detail should be readily apparent. The fluid media is directed along the length of the tubular collector 43 around the exterior of cross-connecting tube 47 therein and in heat exchange contact with the inner surface of inner tube 43 of the collector. The fluid flows along the length of tube 43 to near its far end and there enters the cross-connecting tube 47. From there, the fluid flows the length of tube 47 and eventually empties to an exhaust pipe of the system which transports the heated fluid to a place of use such as a heat exchanger or a steam engine or the like (not shown). An array of collector tubes 14 on a manifold section comprise a module and the module may be connected in series or in parallel with another module or modules as the need arises. Frequently the module comprises 8 or 12 pairs of collector tubes 14, but the number is variable to suit a particular installation.

Over the length of the glass surface of inner tube 43 the exterior surface 44 is coated with a thin metallic coating which has low emissivity such as aluminum, copper, gold or silver. The glass tube may also be coated with a solar selective coating (i.e. a coating which has high absorptivity and low emissivity such as noble metals including copper, silver or gold alloyed with a few percent ($<30\%$) with one or more of the transition metals. The noble metals include gold, silver and copper. The metallic coating can be made by vacuum deposition of a thin layer (1000 to 1500 Å) of metal over the outer surface of absorber tube 43.

Such solar selective alloy coatings as disclosed herein are not the invention of the present applicants as such, but rather is the prior sole invention of coapplicant Hanlet and will be the subject matter of another patent application. The use of such alloy coatings is described in combination with the grooved absorber configuration of the present invention as a potential best mode of practicing the present invention in the sense of 35 USC 112. In this instance the best mode of practice of the present invention may include the solar selective alloy coating of Hanlet.

Solar selective coatings of the prior art which may also be adapted for use in conjunction with the grooved absorber configuration of the present invention include those described in U.S. Pat. Nos. 4,016,860; 3,227,153; 3,173,801; 3,920,413; Chapter 12 of the book entitled, "Direct Use of the Sun's Energy" by Farrington Daniels published by Yale University Press (1964) and the references cited in Chapter 12 thereof; the article entitled "Deposition of Semiconductor Films With High Solar Absorptivity" by D. M. Mattox and G. K. Kominiak, J. Vac. Sci. Technology; Vol. 12, No. 1 Jan./Feb. 1975 pages 182–185; the article entitled "Solar Absorptance and Thermal Emittance of Evaporated Coatings" by Louis Drummeter, Jr. and George Haas, appearing in the text entitled "Physics of Thin Films", edited by G. Haas and R. F. Thun, Academic Press, New York, N.Y., 1964, Vol. 2, pages 305 to 361; NITS Bulletin N75-31568 April 1975 (Simon); and "Survey of Coatings for Solar Collector", NITS Bulletin N-75-23989 November 1974 (G. E. McDonald), the disclosures of which are incorporated herein by reference.

Figure 5:
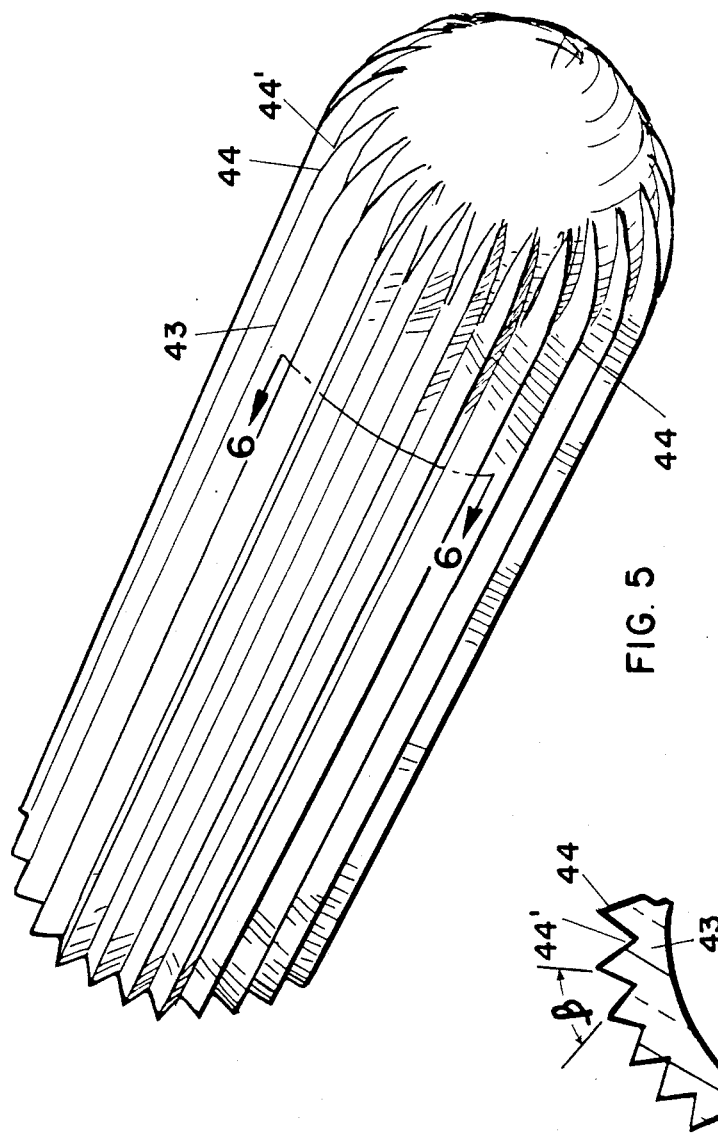
FIG. 5 is a perspective view of a tubular absorber element and represents a less preferred embodiment of the invention.
Figure 6:
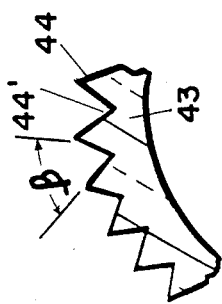
FIG. 6 is a sectional view taken along line 6—6 on FIG. 5.
Figure 7:
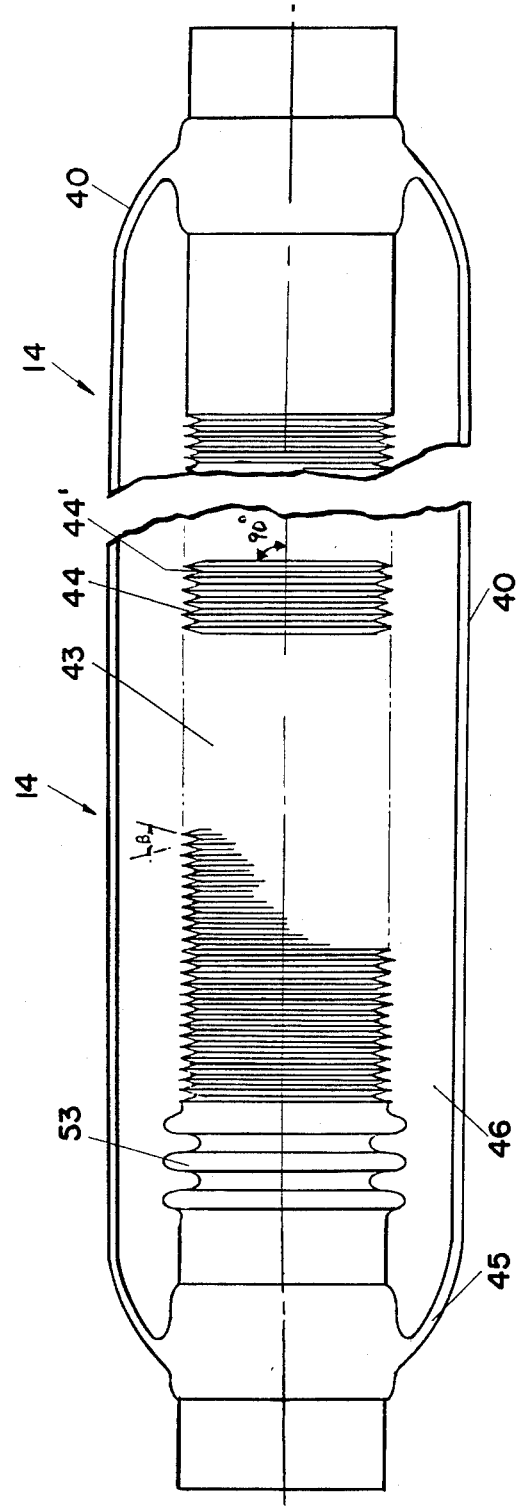
FIGS. 7 and 8 are side views, partly broken away and in section, and represent an embodiment of a tubular collector having absorber elements of different configurations which are attached to a bellows.
Figure 8:
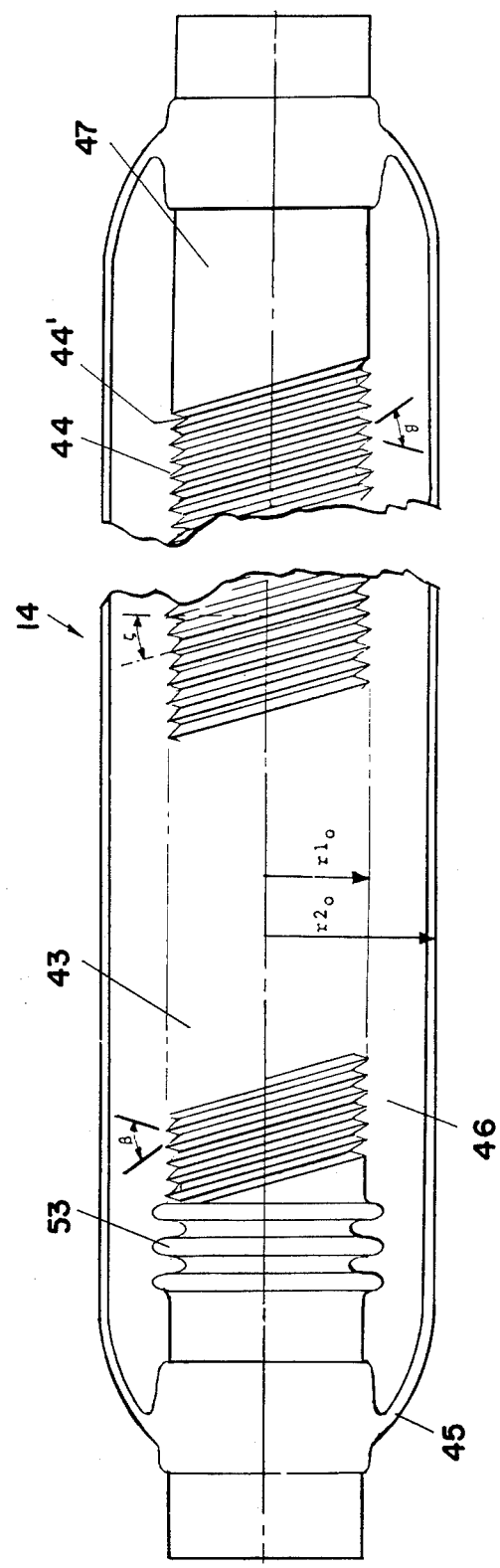
Figure 9B:
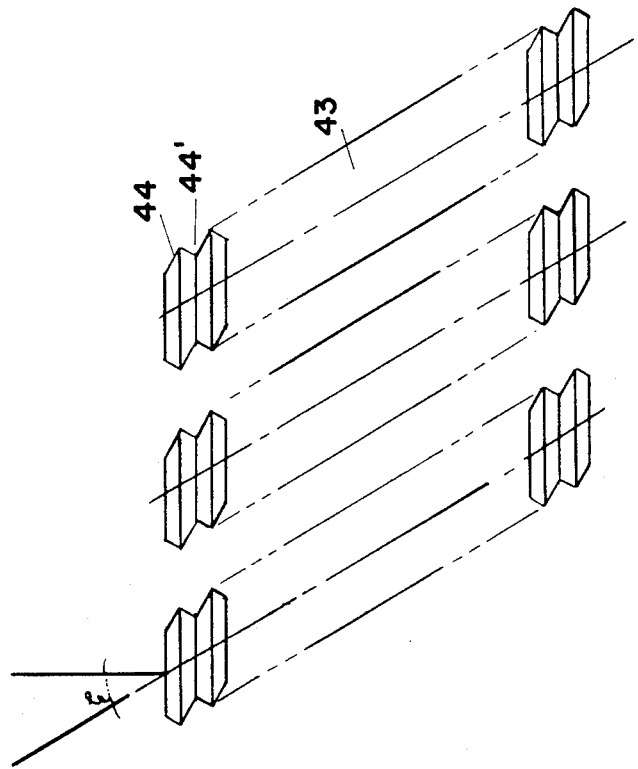
FIG. 9B is a schematic plan view of an absorber tube having helical grooves, as seen in FIG. 8, in which the grooves are expanded for illustrating the decrease in shading effects with angle $\zeta$ for helical grooves.
Figure 12:
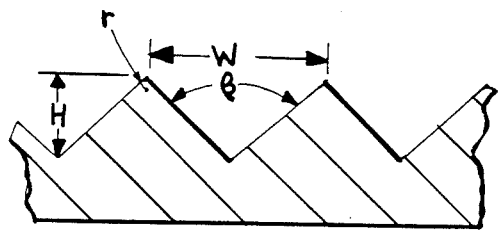
Figure 12A:
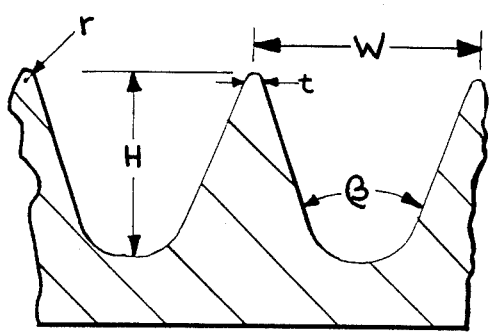
Figure 12C:
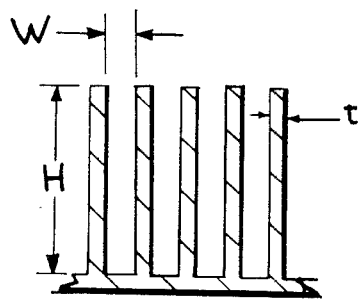

The exterior surface 44 of absorber 43 may be shaped in the form of a sharp triangular groove 44', either as parallel grooves normal to the axis of revolution of absorber 43 as shown in FIGS. 1, 3, 7 and 9A, or as helical grooves as shown in FIGS. 8 and 9B. The term "groove" as used herein is meant a long narrow cut or indentation on the exterior surface of absorber element 43. The groove can be continuous, as in a helix, or in the form of a series of individual parallel grooves. The groove cross-section configurations are illustrated in FIGS. 12 to 12D wherein r represents the apical radius and t represents the thickness. The ratio of H/W in all of the figures should preferably be greater than 10. The ratio of T/R is 2. As shown in FIG. 5, the absorber element 43 may also have longitudinal grooves with their axes parallel to the axes of revolution. Operationally, the longitudinally grooved absorber tube elements are less preferred since irrespective of the orientation of the tube, either N-S or E-W, the radiation falling on the absorber tube will not illuminate all the grooves with the same angle of incidence and hence the ability to capture direct or diffuse radiation will decrease rapidly.

Figure 12B:
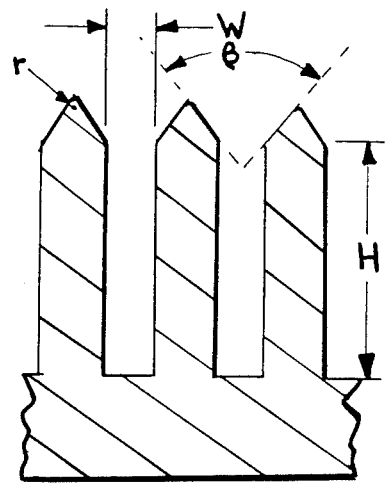
Figure 12D:
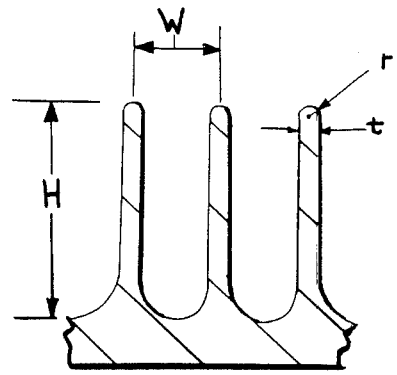

The angular openings ($\beta$) of the triangular groove of FIGS. 12B and 12 may vary from 3° to 30° and the depth of the groove may range from about 200 microns to 1500 microns in regard to FIG. 12. The basis for these considerations is set forth herein below in Equations 2 and 3. In FIG. 12B the ratio H/W should be greater than 10 and smaller than 50 based on Equation 2. The grooved surface is achieved in a conventional manner by a variety of means such as machining, e.g., lathe cutting or grinding, by exploding a charge inside the thin walled absorber tube contained in a mold defining the groove, or by electrochemical milling and the like. Whatever the method chosen, the surface should preferably have a specular finish although irregularities of the surface of a few microinches are not considered detrimental.

The crest of the grooves of FIGS. 12B and 12 used in absorber tube 43 preferably have an apical diameter (t) of 100 microinches although grooves having a flattened or rounded incomplete crest diameters can be utilized providing the radii thereof do not exceed 20 to 25 microinches.

For example with the structure of FIG. 12, depending on the angle $\beta$ between the two walls of a groove and the angle of incidence $\theta_i$ of the radiation falling on the specular surface of the groove, this incident energy will experience a number N of successive reflections within the groove resulting into an absorptance A of the radiation primarily function of N.

This absorptance A is more conveniently expressed as a function of the reflectance R of the opaque material of the groove by the relation:

$$A = 1 - R^N \qquad 1$$

Which shows that the absorptance A would approach unity even for a material having a relatively high reflectance, if the number N of reflections is sufficiently large. The relationship between N, $\beta$, and the angle of incidence $\theta_i$ of the energy rays is given by:

$$N = \frac{(\theta_i \times 2)}{\beta} + 1 \qquad 2$$

Figure 13:
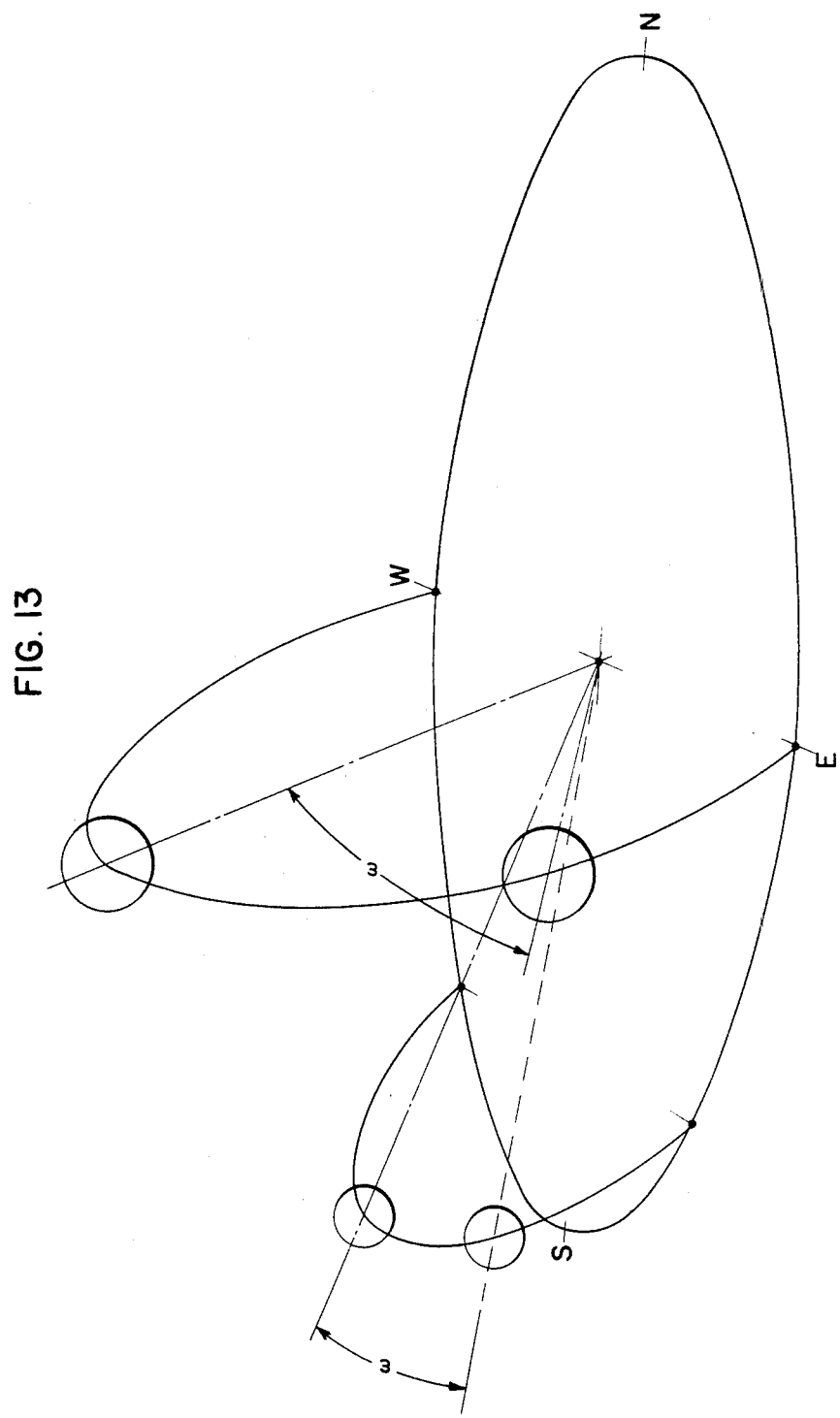
Figure 13B:
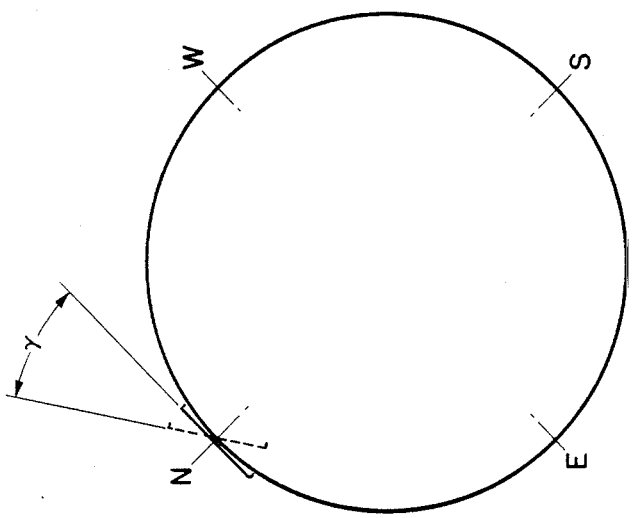
Figure 13A:
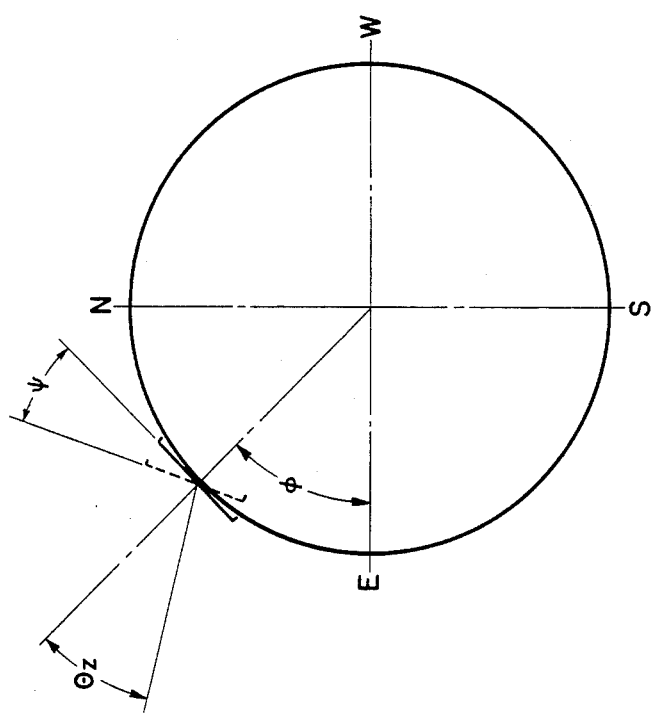

As shown in FIG. 13A for the direct rays of the sun the angle of incidence $\theta_i$ is obtained as a function of the Zenith angle $\omega$ by the relation:

$$\theta_i = 90 \left( \omega + \frac{\beta}{2} \right) \qquad 3$$

This angle of incidence $\theta_i$ increases by a value equal to $\beta$ for each reflection and only one reflection would be achieved for the direct rays of the sun when:

$$90 - \omega = N\beta \qquad 4$$

Which shows the trade off that can be achieved between N and $\beta$, or R and $\beta$, or R and N. To operate efficiently with large groove angle a material of small reflectance must be used or the solar hour angle $\omega$ would be reduced i.e. the total time within which solar energy would be captured would be reduced.

For the direct rays of the sun, with the groove axis oriented North-South as shown in FIGS. 13B, the value of N changes with the position of the sun on the ecliptic, that is, the sun's rays will hit the right wall of the groove between sunrise and solar noon and conversely the left wall between solar noon and sunset. With the groove oriented East-West as shown in FIG. 13B the performance would be independent of the hour angle $\omega$ but would depend on the solar declination angle $\delta$ which in turn would depend on the lattitude $\phi$ and the angle $\psi$ the illuminated wall of the groove makes with the horizontal.

Assuming for example that the absorber is made of a tube of pure aluminum, or a glass tube coated with an opaque film of pure aluminum, with the grooves having an angle $\beta = 8°$ and their axis oriented East-West, the absorptance A would reach at any wavelengths within the solar energy spectrum reaching the earth, a minimum value of 98%. With a total emissivity of 6% for aluminum at 773° K., the ratio $\alpha/\epsilon$ achievable would be greater than 16, then the minimum stagnation temperature for 100 milliwatts $cm^{-2}$ of solar energy reaching the earth would be 730° K. or a Carnot efficiency of 60%.

These results are obtained by the classical equations:

$$\left( \frac{Watts \times \alpha}{5.8210^{-12} \times \epsilon} \right)^{.25} = T_s °\kappa$$

$$\frac{T_s - T_a}{T_s} = \text{efficiency in \%}$$

with $T_a$ the ambient temperature.

In the groove structure shown in FIGS. 12 (B), (C), and (D) the grooves can be formed by depositing or otherwise applying a discrete pattern of metal or other material of low emissivity to a glass absorber. When the height (H) of the groove is sufficiently high as compared to the width (W) (e.g. about 10:1 or greater) as shown in FIG. 12 the fact that the base of the groove is made of glass will not significantly contribute to the emissivity losses.

If expressed for example for the direct rays of the sun as a function of the solar declination $\delta$, the latitude of the absorber $\phi$ and $\omega$ the solar hour angle by the relation:

$$\frac{1}{2}N = \frac{\sin \theta_z}{\sin \beta} = \frac{\sin\delta \sin\phi + \cos\delta \cos\phi \cos\omega}{\sin \beta} \quad 5$$

To illustrate that the performance of a solar collector based on the novel absorber element is essentially independent on orientation of the sun, the position in which the tube is used must be considered. As an example, the absorber tube may be lying horizontal to the ground with its axis of revolution oriented North-South, or oriented East-West, or anywhere between these extreme positions of the longitudinal axis of the tube. The structural surface of the tube could be made indifferently with either parallel grooves, or with helical grooves with a single, or a multipitched screw threading.

In the first case of parallel grooves, if the tube is horizontal with respect to the ground, at any latitude the grooves's walls will make an angle $\psi$ with the horizontal. If the grooves are helical, the walls, besides making the angle $\psi$, will also have an azimuthal angle $\gamma$ with respect to either the axis North-South i.e., the meridian, or with the axis East-West. The general equation taking into account the various angles giving the angle the direct rays of the sun makes with the normal to the illuminated surface $$\cos \theta_z = \sin \delta \sin \phi \cos \psi - \sin \delta \cos \phi \sin \psi \cos \gamma + \\ \cos \delta \sin \phi \cos \psi \cos \omega + \cos \delta \sin \phi \sin \psi \cos \gamma \cos \omega + \\ \cos \delta \sin \psi \sin \gamma \cos \omega \quad 6$$

with $\delta$ the solar declination given by Cooper* equation as $$\delta = 23.42 \sin\left(360 \frac{284 + D}{365}\right) \quad 7$$

with D the day of the year.
*P. I. Cooper Solar Energy 12. 3. (1969)

When the absorber tube is made with parallel grooves with, for example, the longitudinal axis of the tube oriented North-South, Equation 6, simplifies since the terms of the equation containing the hour angle $\omega$ will drop out. This results from the fact that the sun will be parallel to bisectrix of the angle $\beta$ of the groove, irrespective to the hourly position the sun may have on the ecliptic. This is the same situation one would have if a flat plate absorber with parallel grooves were made to follow the sun.

As an example, considering the absorber with the parallel grooves axes oriented East-West and applying Equation 6, 2, and 3 and assuming, for example, a material with a maximum reflectance R of 40%, it is found that the absorptance is only function of the angle $\beta$, the angle between the walls of the groove, taking, for example, a value $\beta = 10°$, the absorptance A will remain constant at 100% during the winter solstice for any latitude comprised between 65° and 10° above the equator. For a latitude smaller than 10°, the absorptance will begin to decrease and reach 99.8% at 5° latitude North.

During the summer solstice, however, if the absorptance remains at 100% at high latitude, it drops in magnitude with a decrease in latitude to a value of 95.2% at 35° latitude, and to 70.1% at 25° latitude. In this example, the position of the absorber was horizontal. It can be shown, however, that the absorptance can be maintained at 100% irrespective to the solar altitude and at any latitude, either by reducing the value of the angle $\beta$ and correcting accordingly the angle $\psi = 90 - \beta/2$ or by tilting the tube. For example, decreasing the angle $\beta$ to 6° would give at the summer solstice an absorptance of 98.8% at 35° latitude compared to 95.2%, and an absorptance of 75.3% at 25° latitude compared to 70.1% with $\beta = 10$.

Besides the parallel groove structure with the groove axis normal to the axis of revolution of the tube, the groove of the absorber element may assume a helical shape like a screw thread, which would still result into parallel grooves but, with the groove axis making an angle $\zeta$ with the normal to the axis of revolution of the tube as shown in FIG. 8. For a right handed screw thread, if the tube is oriented N-S, this will result into an azimuthal orientation $\gamma = \zeta$ which will be negative before noon and positive afternoon the illuminated wall of the groove instead of being parallel to the E-W axis will be tilted on this axis by the angle $\gamma = \zeta$. If the tube is oriented E-W, the azimuthal angle will become $\gamma = 90 - \zeta$, with of the groove looking East being illuminated during the morning hours and the other wall of the groove during the afternoon hours. Irrespective of the orientation N-S or E-W of the tube axis, no gain would be achieved with this structure compared to the non-helical parallel grooves, except in one respect, which is unique in this structure as discussed hereinafter.

Figures 9, 9A:
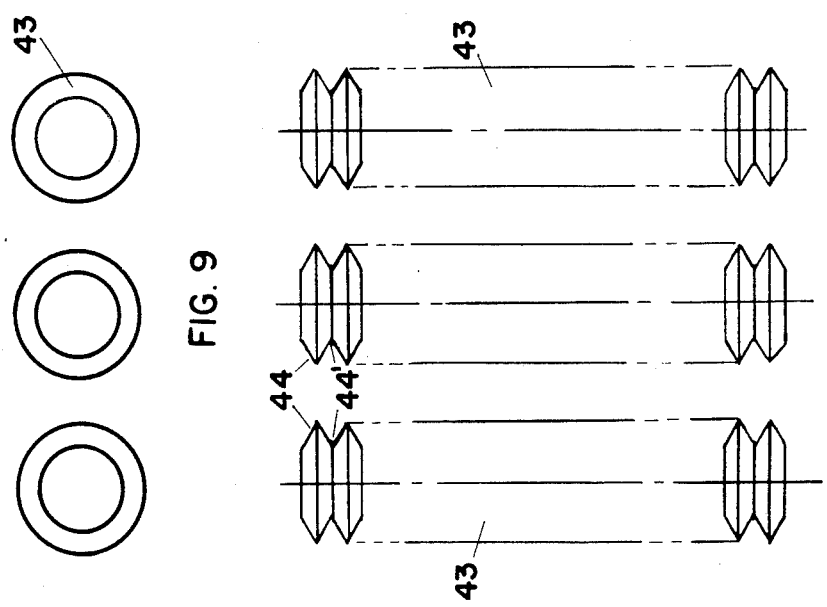
FIG. 9 is a cross-section showing absorber elements assembled in adjacent banks.
FIG. 9A is a schematic plan view of an absorber tube having parallel grooves, as seen in FIGS. 7 and 9, in which the grooves are expanded.

In order to collect adequate amounts of energy from the sun, large areas of collecting surface must be provided and this is the condition implied in the use of flat collectors. Since the grooved tubular structure in the parallel or helical grooves configurations can operate within a large angle from bisectrix of the groove, the absorber tube structure operates with the same efficiency whether the incident radiation is direct or diffuse, particularly when the surface of the groove is specular. Consequently grooved absorber tubes 43 can be assembled in banks either adjacent or with an optimum spacing between them as shown in FIGS. 9. Assuming the tubes are oriented N-S, it is shown in FIGS. 9 that at a given spacing D, between the tubes related to the radii r1o, and r2o, of absorber tube 43 and covering tubes respectively, shading will occur at a solar hour angle $\omega_o$ given by the relation $$\omega_o = \cos^{-1}\{(r1o + r2o)/D\} \quad 8$$

with $D = 4\,r_{2o}$, the angle $\omega_o$ would correspond to 63° or approximately four (4) hours from solar noon. The same results would be achieved with the parallel groove tubular structure, but not with the helical groove structure where the expression for $\omega_o$ would be $$\omega_o = \cos^{-1}\{[(r_{1o}+r_{2o})/D]\cos\zeta\} \qquad 9$$

with $\zeta$ the angle between meridian and the axis of revolution of the tube. Thus with the same spacing between tubular collectors, this particular structure would allow an increase in useful solar hour angle $\omega$. For example, with multiple thread grooves with a high helix angle $\zeta$ of about 30° it is easy for the spacing between tube axes to increase the time of collection by two hours daily i.e. a gain of 25% in collecting time. This feature is a unique property of the tubular structure with helical grooves.

The use of grooves on the absorber element of the invention have been found to provide high absorption for solar energy having light wave lengths in the 0.3 μm and 2.2 μm range. Due to the multiple reflections obtained through use of a grooved structure, the absorber element 43 provides high absorption with low emissivity of infrared. The grooved structure 44' preferably has a specular finish so that a light wave falling thereon is reflected as it would be from a perfect mirror i.e., with equal angles of incidence and reflectance with respect to the normal to the mirror plane. Hence, eventhough the surface of the groove may have low absorptivity, the multiple reflections achieved through use of a grooved structure can provide an absorptance of more than 99% of the incident solar energy.

Even in assuming that the same angular configuration and the same materials were adopted such as disclosed, for example, in U.S. Pat. No. 4,154,220, the proposed tubular structure of the present application offers the advantage of the symmetry of revolution. In the case of the flat plate the emitting surface area is equal to the collecting surface area, whereas, for the tubular structure since it is capable of the same efficiency of absorption over 360° the absorbing tube of small diameter located at the focal of a parabolic reflector of the same aperture as the flat plate would offer a gain equal to $$\text{Gain} = \left(\frac{\text{area of flat plate}}{\text{area of the cylindrical absorber}}\right)^{.25}$$

The grooved absorber element disclosed herein may be embodied in different configurations as is shown in FIGS. 7 and 8 wherein a bellows 53 is attached to absorber element 43 to absorb the change in length in the absorber due to the difference in temperature between the glass cover tube 40 and absorber. The bellows may be made a part of the tubing or can be separately fabricated and welded to the absorber element 43. As shown in FIGS. 10 and 11, the absorber of radiation relies on symmetry of revolution to achieve its efficiency in collecting electromagnetic energy independent of the angle of incidence of any radiation either of the direct rays of the solar rays or diffuse radiation from the sky or the ground. As shown in FIGS. 10 and 11 the electromagnetic energy collector simply comprises two concentric cylinders 40 and 43 wherein the inner cylinder 43 represents the absorber of radiation which is made of metal or coated glass with an outer radius $r_{1o}$ and the other an outer cylinder 40 made of transparent glass which has an inner radius of $r_{2i}$.

The absorptance of the grooved structure is a function of the reflectivity of the material, the angle $\beta$ between the walls of a groove and the angle of incidence of the solar radiation. It is possible therefore to trade between these characteristics to achieve the same performance e.g. decreasing the angle $\beta$ allows the use of a higher reflectivity material, or allows a smaller angle of incidence therefore a larger solar angle with respect to zenith. In order to satisfy the prerequisite of a low emittance of the structure, however, there is no trade off, a low emissivity material must be used particularly when the collector is operated at high temperature.

From the foregoing it can be seen that the novel absorber element of the invention provides a solar collector having unique and unusual characteristics which provide the following advantages:

1. The symmetry of revolution with the grooved structure enables the absorber to capture direct or diffused solar radiation over 360°.
2. Ability to trade between optical properties and the angle of the grooves.
3. The reduction of emitted energy as a result of the reduced size of the surface of the absorber element.
4. Symmetry of revolution is compatible with a vacuum between the absorber and outer glass tube as a means of minimizing heat loss by convection.
5. Independence from orientation toward the sun to optimize response, i.e., performance, high absorptivity and heat transfer.
6. Thermal conduction loss is minimized due to reduced area of construction.
7. Broad choice of materials of construction which are not dependent on optical properties.
8. Relatively simple and inexpensive to construct.
9. A highly efficient alternate source of energy not dependent on fossil fuels.

What is claimed is:

1. An energy absorber system for heating fluid therein responsive to impingement by energy within the electromagnetic spectrum, comprising:
   (a) a rigid outer tube member substantially transparent to predetermined bandwidths within said electromagnetic spectrum, said outer tube member having an outer tube member axis line;
   (b) a first inner tube member containing said fluid to be heated, being mounted internal said outer tube member substantially coincident with said outer tube member axis line, said outer and first inner tube members being spaced each from the other defining an evacuated chamber therebetween, said first inner tube member having grooves formed on an external surface thereof, and a substantially smooth inner surface for providing substantially linearly directed fluid flow in said axis line direction, said grooves defining an included angle within the approximate range between 3.0° to 30.0°, said grooves having a metallic coating formed thereon adapted to provide a plurality of reflections of said energy within said grooves; and,
   (c) a second inner tube member mounted internal said first inner tube member, said first and second inner tube members being spaced each from the other, said fluid to be heated entering said energy absorber system within an annular space defined by said substantially smooth inner surface of said first inner tube member and a substantially smooth external surface of said second inner tube member between said first and second inner tube members and exiting through said second inner tube member in a linearly directed manner.

2. The energy absorber system as recited in claim 1 where said grooves formed on said external surface of said first inner tube member extend over substantially the entire circumference of said first inner tube and substantially throughout a length of said first inner tube member in a direction coincident with said axis line, said first inner tube member being impinged by said energy within said electromagnetic spectrum over a full 360° arc.

3. The energy absorber system as recited in claim 2 where said grooves are formed in accordance with the relation:

$$H/W > 10.0$$

where:
- H = height of said grooves above said external surface of said first inner tube member
- W = width between successive grooves.

4. The energy absorber system of claim 1 wherein the first inner tube member is constructed of glass, coated with a film of metal of low emissivity.

5. The energy absorber system of claim 1 wherein the first inner tube member is constructed of glass, coated with a solar selective coating.

6. The energy absorber system of claim 1 wherein the first inner tube member is constructed of metal.

* * * * *